(12) United States Patent
Kurth et al.

(10) Patent No.: US 10,197,113 B2
(45) Date of Patent: Feb. 5, 2019

(54) COUPLING DEVICE AND DRIVE TRAIN HAVING A COUPLING DEVICE

(71) Applicant: Schaeffler Technologies AG & Co. KG, Herzogenaurach (DE)

(72) Inventors: Franz Kurth, Nuremberg (DE); Ralph Schimpf, Furth (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 37 days.

(21) Appl. No.: 15/540,164

(22) PCT Filed: Jan. 14, 2016

(86) PCT No.: PCT/DE2016/200016
§ 371 (c)(1),
(2) Date: Jun. 27, 2017

(87) PCT Pub. No.: WO2016/124180
PCT Pub. Date: Aug. 11, 2016

(65) Prior Publication Data
US 2017/0356509 A1     Dec. 14, 2017

(30) Foreign Application Priority Data

Feb. 5, 2015   (DE) .................. 10 2015 202 039

(51) Int. Cl.
*F16D 47/04* (2006.01)
*F16D 43/18* (2006.01)
(Continued)

(52) U.S. Cl.
CPC ............ *F16D 47/04* (2013.01); *F16D 13/04* (2013.01); *F16D 13/16* (2013.01); *F16D 13/64* (2013.01);
(Continued)

(58) Field of Classification Search
CPC .................................................. F16D 41/082
See application file for complete search history.

(56) References Cited

U.S. PATENT DOCUMENTS

| 5,501,310 A | 3/1996 | Kajitani et al. |
| 2005/0109574 A1 | 5/2005 | Kushino |

(Continued)

FOREIGN PATENT DOCUMENTS

| DE | 4429508 | 2/1995 |
| EP | 1655501 | 5/2006 |
| WO | 2014011610 | 1/2014 |

*Primary Examiner* — Mark A Manley
(74) *Attorney, Agent, or Firm* — Volpe and Koenig, P.C.

(57) ABSTRACT

The invention relates to a coupling device for a drive train of a motorcycle or other motor vehicle, in particular for suppressing a so-called hopping. According to the invention, the coupling device has an output rotation part, a switchable friction coupling, which has an energy storage device for closing thereof and which is closed in an unactuated state, and at least one freewheel coupling for forming a torque transmission path for torque transmission from the input rotating part to the output rotating part, wherein the freewheel coupling includes the following components: an inner rotating element, the outer circumference of which forms a sawtooth-shaped circumferential structure having a plurality of circumferentially extending ramps; a substantially annular plate structure having an individual plate element or a stack of a plurality of plate elements, the inner circumference of which forms a sawtooth-shaped circumferential structure having a plurality of circumferentially extending counter-ramps to form an interlock and/or a friction lock together with the ramps of the inner rotating element in a rotation direction; and an outer rotating element surrounding the plate structure. The invention further relates to a corresponding drive train having such a coupling device.

7 Claims, 1 Drawing Sheet

(51) Int. Cl.
   *F16D 13/16*   (2006.01)
   *F16D 13/64*   (2006.01)
   *F16D 23/12*   (2006.01)
   *F16D 13/04*   (2006.01)
   *F16D 41/08*   (2006.01)
   *F16D 41/063*  (2006.01)
   *F16D 45/00*   (2006.01)
   *B60K 17/02*   (2006.01)

(52) U.S. Cl.
   CPC ........... *F16D 23/12* (2013.01); *F16D 41/063* (2013.01); *F16D 41/082* (2013.01); *F16D 43/18* (2013.01); *F16D 45/00* (2013.01); *B60K 17/02* (2013.01); *F16D 2023/123* (2013.01)

(56) References Cited

U.S. PATENT DOCUMENTS

2013/0025997 A1* 1/2013 Kataoka ............... F16D 13/56
                                                192/70.23
2014/0014455 A1  1/2014 Davis
2014/0110207 A1  4/2014 Davis
2014/0332335 A1  11/2014 Strong
2014/0353107 A1  12/2014 Hemphill \* cited by examiner

COUPLING DEVICE AND DRIVE TRAIN HAVING A COUPLING DEVICE

BACKGROUND

The invention relates to a coupling device for a drive train of a motorcycle or some other motor vehicle, especially for the suppression of wheel hopping. The invention further relates to a corresponding drive train with such a coupling device.

Such a coupling device for the suppression of wheel hopping is known as an anti-hopping clutch (also "slipper clutch" or "back-torque limiter") for the drive train of powered two-wheel vehicles, such as motorcycles. Such an anti-hopping clutch transmits the braking force of the motor in overrun mode to the driven rear wheel only under certain conditions.

The vehicle torque of motor vehicle drive motors, especially of motorcycles, has continued to rise higher and higher in recent years. The high transmittable torque of the clutch has the result that the rear wheel can begin to hop in an overrun mode, which can result in the complete loss of grip or traction when easing up on the throttle, for example, at high rotational speeds. The loss of traction of the rear wheel, especially in a tilted position when driving in a curve, makes the motorcycle unstable up to uncontrollable. In the worst case, the lateral slippage of the rear wheel could result in the driver crashing. The anti-hopping clutch prevents this reaction of the motor brake on the rear wheel and thus provides more safety in normal street traffic. For example, through the use of a so-called booster coupling, the hopping of the rear wheel can be prevented when shifting down. This coupling system has a pilot-control coupling and a main coupling. Here, both elements are connected to each other by roller bodies by a ramp system, so that the actuation of the main coupling is dependent on the state of the drive train (traction mode or overrun mode). When the pilot-control coupling is closed, due to the established torque, the ramps of the ramp system are rotated and thus the main coupling is closed. The energy required for actuating the main coupling is delivered by the motor in this system and only the force for closing the pilot-control coupling has to be applied from the outside.

Furthermore, coupling devices are known in which the pilot-control coupling and the main coupling are not separated, but instead the carrier is connected to the hub by a slide tilting (screw kinematics). This slide tilting is for both the transmission of the torque and also the transmission of the axial forces. In this way, the transmitted torque can be used to generate an additional axial force that supports the tension springs. Here it has proven problematic that such a construction of the coupling device requires additional parts which increases the installation space and increases the production costs.

US 2014/0353107 A1 describes a freewheeling clutch in combination with a planetary gear, wherein a friction clutch operated by a piston element is also present.

US 2005/0109574 A1 discloses a drive force transmission device with a main coupling that transmits a drive force between a housing and an inner shaft and with a pilot coupling, wherein a cam mechanism is arranged between the two couplings.

DE 4429508 A1 describes a motorcycle coupling with a conical plate spring.

SUMMARY

The objective of the invention is to provide a coupling device and a drive train with coupling device in which the coupling device has a compact and economical construction.

The objective is achieved by the use of one or more features according to the invention. Preferred constructions of the invention are disclosed below and in the claims that can each be an aspect of the invention individually or in combination.

The coupling device according to the invention for the drive train of a powered two-wheel vehicle or some other motor vehicle, especially for the suppression of so-called hopping, comprises: an input rotating part, an output rotating part, a switchable friction coupling that has an energy storage device for its closing and is closed in the non-actuated state, and at least one free-wheeling clutch for forming a torque transmission path for the torque transmission from the input rotating part to the output rotating part (traction mode), wherein this free-wheeling clutch comprises the following components (i) an inner rotating element whose outer circumference forms a sawtooth-shaped circumferential structure with multiple ramps on the circumference, an essentially ring-shaped plate structure with an individual plate element or a stack made from multiple plate elements whose inner circumference forms a sawtooth-shaped circumferential structure with multiple counter ramps on the circumference for forming a positive-fit and/or friction-fit connection with the ramps of the inner rotating element in one direction of rotation, and (iii) an outer rotating element surrounding the plate structure.

Through the use of the free-wheeling clutch it is guaranteed that the torque transmission path for the torque transmission from the input rotating part to the output rotating part is set up such that no torque is transmitted from the output rotating part to the input rotating path over this path. The free-wheeling clutch with the plate structure makes the coupling device economical and (axially) very compact.

In particular, here is it provided that the free-wheeling clutch is constructed as a kind of free-wheeling clutch known under the term "wedge-blade clutch" or "wedge clutch." A description of this free-wheeling clutch can be found, for example, in the publication WO 2014/011610 A1. The free-wheeling clutch is now constructed in an axially significantly more compact way through the use of this "wedge clutch"-like construction.

According to the invention, the inner rotating element is mounted so that it can move axially, wherein the sawtooth-shaped circumferential structure has, on the outer circumference of the inner rotating element, axial ramps distributed on the circumference for the axial displacement of the inner rotating element relative to the plate structure in the direction of rotation opposite the first direction of rotation (the free-wheeling direction of the free-wheeling clutch). The axial ramps are arranged, in particular, on the nearly radial sections of the sawtooth shape between the circumferential ramps.

Here it is provided that, through the axial displacement of the inner rotating element, another torque transmission path that is different from the torque transmission part for the torque transmission from the input rotating to the output rotating part is formed for the torque transmission from the output rotating part to the input rotating part (overrun mode). This can now be constructed so that a certain degree of engine braking is enabled in traction mode, but the hopping mentioned above is stopped.

Through the ramp angle of the circumferential ramps and the axial ramps, the traction/overrun components can be set.

The coupling device according to the invention further has a friction disk that can be pressed by the axial displacement of the inner rotating element against another rotating part of the coupling device. The additional torque transmission path then runs via this friction disk from the output rotating part to the input rotating part.

According to another preferred construction of the invention, the outer rotating element has two parts that are supported so that they can move axially relative to each other and form pressure plates of the switchable friction clutch between which an outer circumferential area of the plate structure can be pressed.

Here it is provided, in particular, that the outer circumferential area of the plate structure and also corresponding inner circumferential areas of the parts of the outer rotating element that can move axially are beveled. Through this construction, the free-wheeling clutch function of the wedge-blade clutch can be connected in an especially easy way to the switchable friction clutch function of the outer rotating element divided into two parts.

According to the invention it is provided that the switchable friction clutch is a friction clutch that is closed in the non-actuated state. Accordingly, the resulting coupling device is also a (normally closed) clutch that is closed in the non-actuated state. This coupling type is common in the drive trains of powered two-wheel vehicles.

Here it is provided that the switchable friction clutch has an energy storage device for its closing. In a typical normally open single disk dry clutch, for example, a plate spring is used as such an energy storage device. In an especially preferred way, the energy storage device is formed, however, as an arrangement of spring elements. These spring elements are, in particular, helical springs acting as compression springs.

According to one preferred embodiment of the invention, it is provided that one of the elastic components of the plate structure is arranged between at least two of the circumferential sections of the plate structure forming the counter ramps.

According to another preferred embodiment of the invention, a complete material recess is provided in a circumferential section arranged between two of the circumferential sections of the plate structure forming the counter ramps. Through this elastic construction and the recess, the known free-wheeling clutch function is guaranteed in an especially good way.

In particular, it is provided that the at least one plate element has a one-piece construction.

In the drive train of a powered two-wheel vehicle according to the invention or another motor vehicle with a drive machine, a transmission, and a coupling device connected in-between a drive machine and transmission, it is provided that the coupling device is constructed as described above.

BRIEF DESCRIPTION OF THE DRAWINGS

The invention is explained below with reference to the accompanying drawings using preferred embodiments as examples, wherein the features shown below can represent aspects of the invention both individually and also in combination. Shown are.

DETAILED DESCRIPTION OF THE PREFERRED EMBODIMENTS

Figure 1:
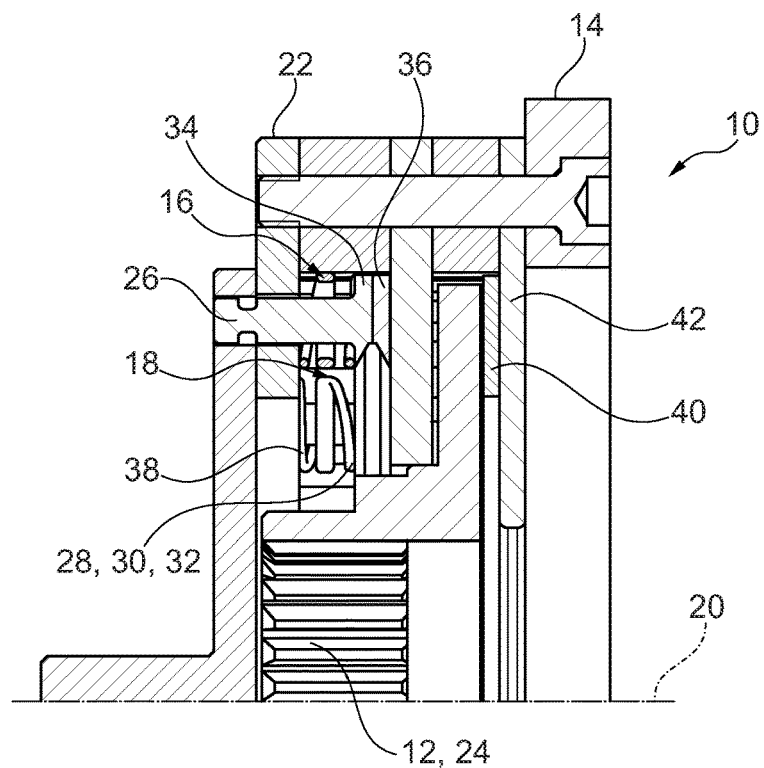
FIG. 1: in a section diagram, the upper half of a coupling device for the suppression of so-called hopping in the drive train of a motorcycle according to a preferred embodiment of the invention.

FIG. 1 shows, in a section view, the upper half of a coupling device 10 for the (not shown) drive train of a powered two-wheel vehicle for the suppression of so-called hopping. Such a coupling is also called an anti-hopping clutch. In the event of hard braking before a curve and simultaneous quick down-shifting, motor braking acts on the rear wheel of a motorcycle. This can be sufficient to block the rear wheel relieved of force by the dynamic wheel load distribution. In this way, hopping or jumping of the rear wheel can occur, which can result in the complete loss of grip or traction.

The coupling device 10 has an input rotating part 12, an output rotating part 14, a switchable friction clutch 16, and a free-wheeling coupling 18 for forming a torque transmission path for torque transmission from the input rotating part 12 to the output rotating part 14 (in traction mode). The input rotating part 12 and the output rotating part 14 here rotate about a common rotational axis 20. The output rotating part 14 is constructed as an annular gear that is arranged on the outer circumference of a housing 22 and is connected rigidly to this housing. The free-wheeling clutch 18 is constructed as free-wheeling clutch 18 known as a so-called "wedge-blade clutch" or "wedge clutch" and has, on its side, three main components 24, 26, 28 arranged coaxial with respect to the rotational axis 20 and supported so that they can rotate. These components are: an inner rotating element 24 constructed as an inner ring, an outer rotating element 26 constructed as a (two-part) outer ring, and an essentially ring-shaped intermediate element 28 arranged radially between these two rotating elements 24, 26. The intermediate element 28 is formed of a plate structure 30 that has a plate element 32 as a main component. The plate element 32 here has a one-piece construction. The inner rotating element 24 forms, in the shown example, the input rotating part 12 and is further supported so that it can also move axially with respect to the rotational axis 20.

The outer rotating element 26 has two parts 34, 36 that are supported so that they can move axially opposite each other. Both parts 34, 36 are connected locked in rotation with the housing 22 by respective teeth and are pressed together by spring elements 38 formed as compression springs. This enables the clamping of the plate structure 30 on the outer rotating element 26, which is typical for the wedge clutch. The outer circumferential area of the plate structure 30 (the wedge plate) beveled on two sides forms, together with the correspondingly beveled and divided outer rotating element 26, the switchable friction clutch 16. The switchable friction clutch 16 is a friction clutch 16 closed in the non-actuated state and has a spring element 38 constructed as a compression spring.

The coupling device 10 has axially adjacent to the inner rotating element 24 a friction disk 40 that is connected locked in rotation to the housing 22 by teeth and can be pressed by an axial displacement of the inner rotating element 24 between this element and another rotating part 42. This other rotating part 42 is likewise connected locked in rotation with the housing 22.

Figure 2:
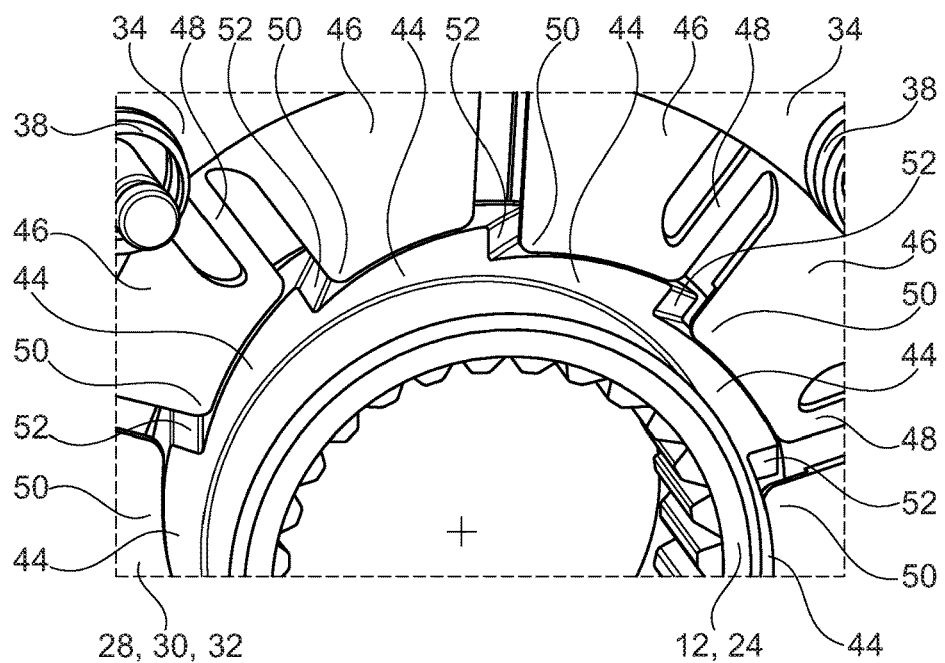
FIG. 2: details of a free-wheeling clutch of the coupling device shown in FIG. 1.

FIG. 2 now shows the construction of the free-wheeling clutch 18 known as a so-called "wedge-blade clutch" or "wedge clutch." The outer circumference of the inner rotating element 24 forms a sawtooth-shaped circumferential structure with multiple ramps 44 increases radially on the circumference in always the same direction. The plate structure 30 surrounding the inner rotating element 24 has multiple sections 46 that are distributed on the circumference and are connected elastically by means of elastic components 48 and has an inner circumference that forms a sawtooth-shaped circumferential structure with counter ramps 50 for forming a positive-fit and/or friction-fit connection to the ramps of the inner rotating element 24 in the direction of rotation for the traction mode.

In a circumferential section between two circumferential sections 46 of the plate structure 30 forming the counter ramps 50, a complete material recess is provided. Through this construction, the known free-wheeling clutch function is guaranteed in an especially good way. If the input rotating part 12, that is, the inner rotating part 24 is rotated in the direction relative to the plate structure 30 in which the circumferentially radially increasing ramps 44 and counter ramps 50 run together, the plate structure 30 is pressed radially outward by the ramps/counter ramps 44, 50 sliding past each other until the outer circumference of the plate structure comes in contact with the two-part outer rotating element 26.

Here, the outer circumferential area of the plate structure 30 and also corresponding inner circumferential areas of the parts 34, 36 that are supported so that they can move axially in the outer rotating element 26 are provided with bevels corresponding to each other, which can be seen well in FIG. 1. Through this construction, the free-wheeling clutch function of the wedge-blade free-wheeling clutch 18 is connected in an especially good way with the friction clutch function of the switchable friction clutch 16 with the outer rotating element 26 divided into the two parts 34, 36.

The shown coupling device has the following characteristics and advantages:
(a) the inner rotating element has, in addition to the usual circumferential ramps 44, also axially directed ramps 52 in the free-wheeling direction of the wedge clutch free-wheeling clutch 18,
(b) fewer friction linings are provided than in conventional anti-hopping clutches,
(c) the traction/overrun parts are adjustable by setting the ramp angle, and
(d) a more compact construction is produced relative to conventional anti-hopping clutches.

The following function is produced:

The torque is introduced via the internal teeth on the inner rotating element 24 from the motor out. The illustrated spring elements 38 load the divided outer rotating element 26 of the wedge clutch 18 with an axial force in order to guarantee clamping of the plate structure 30. Through the friction between the outer rotating element 26 of the free-wheeling clutch 18 and the plate structure 30 (by not shown friction linings), this plate structure 30 with its counter ramps 50 runs up the ramp 44 of the inner rotating element 24 in the rotational direction and thus blocks the relative movement of the inner rotating element 24 relative to the outer rotating element 26 and transmits the torque in the traction mode via the one torque transmission path from the input rotating part 12 to the output rotating part 14. This torque transmission path thus runs from the inner rotating element 24 forming the input rotating part 12 via the plate structure 30, the outer rotating element 26, and the housing 22 to the output rotating part 14 formed as an annular gear.

The energy storage device with the spring elements 38 can be pressed together by a (not shown) actuation lever. By actuating the switchable coupling 16, the complete coupling of the coupling device 10 is thus triggered. If the switchable coupling 16 is not actuated, the pretensioning of the spring elements 38 holds the parts 34, 36 of the outer rotating element 26 of the wedge clutch 18 together.

In the overrun mode, the plate structure 30 detaches from the inner rotating element 24 and rotates in the free-wheeling direction (in FIG. 2 counterclockwise). Now the plate structure 30 beveled multiple times on the inner circumference contacts the axial ramps 52 of the inner rotating element 24 and displaces this inner rotating element 24 in the axial direction. This results in a force on the friction disk 40 arranged axially next to the inner rotating element 24. In this way, in overrun mode, an adjustable torque can be transmitted via another torque transmission path for the torque transmission from the output rotating part 14 to the input rotating part 12. This other torque transmission path thus runs from the output rotating part 14 constructed as an annular gear via the housing 22 and the friction disk 40 to the inner rotating element 24 forming the input rotating part 12.

LIST OF REFERENCE NUMBERS

10 Coupling device
12 Input rotating part
14 Output rotating part
16 Friction coupling, switchable from the outside
18 Freewheel coupling
20 Rotational axis
22 Housing
24 Rotating element, inner (freewheel coupling)
26 Rotating element, outer (freewheel coupling)
28 Rotating intermediate element
30 Plate structure
32 Plate element
34 Part (outer rotating element)
36 Part (outer rotating element)
38 Spring element
40 Friction disk
42 Rotating part, other
44 Ramp, surrounding (inner rotating element)
46 Section (plate structure)
48 Component, elastic
50 Counter ramp, surrounding (inner rotating element)
52 Ramp, axial (inner rotating element)

The invention claimed is:

1. A coupling device for a drive train of a motorcycle or other motor vehicle for suppression of hopping, comprising an input rotating part, an output rotating part, a switchable friction coupling that has an energy storage device for closing thereof and being closed in a non-actuated state, at least one freewheel coupling that forms a torque transmission path for torque transmission from the input rotating part to the output rotating part, said freewheel coupling comprises the following components:
an inner rotating element having an outer circumference that forms a sawtooth-shaped circumferential structure with multiple ramps formed on the outer circumference,
an essentially ring-shaped plate structure with an individual plate element or a stack made from multiple plate elements having an inner circumference that forms a sawtooth-shaped circumferential structure with multiple counter ramps formed on the inner circumference for forming at least one of a positive-fit or friction-fit connection to the ramps of the inner rotating element in one direction of relative rotation of the input rotating part to the output rotating part, and
an outer rotating element surrounding the plate structure, wherein the inner rotating element is supported to move axially and the sawtooth-shaped circumferential structure on the outer circumference of the inner rotating element further has axial ramps distributed circumferentially for axial displacement of the inner rotating element relative to the plate structure in a direction of rotation opposite the one direction of relative rotation, wherein through the axial displacement of the inner rotating element, another torque transmission path for the torque transmission from the output rotating part to the input rotating part is formed that is different from the torque transmission path for the torque transmission from the input rotating part to the output rotating part, and a frictiondisk that is pressed by the axial displacement of the inner rotating element against another rotating part of the coupling device.

2. The coupling device according to claim 1, wherein the outer rotating element has two parts that are supported so that they move axially relative to each other and form pressure plates of the switchable friction clutch between which an outer circumferential area of the plate structure is pressed.

3. The coupling device according to claim 2, wherein the outer circumferential area of the plate structure is beveled like corresponding inner circumferential areas of the parts of the outer rotating element that are supported so that they move axially.

4. The coupling device according to claim 1, wherein the energy storage device comprises an arrangement of spring elements.

5. The coupling device according to claim 4, wherein the spring elements are constructed as helical springs.

6. The coupling device according to claim 1, wherein elastically constructed components of the plate structure are arranged between at least two circumferential sections of the plate structure forming the counter ramps.

7. A drive train of a powered two-wheel vehicle or other kind of motor vehicle with a drive machine, a transmission, and a coupling device connected in-between the drive machine and the transmission, and the coupling device is constructed according to claim 1.

* * * * *